Patented Feb. 27, 1923.

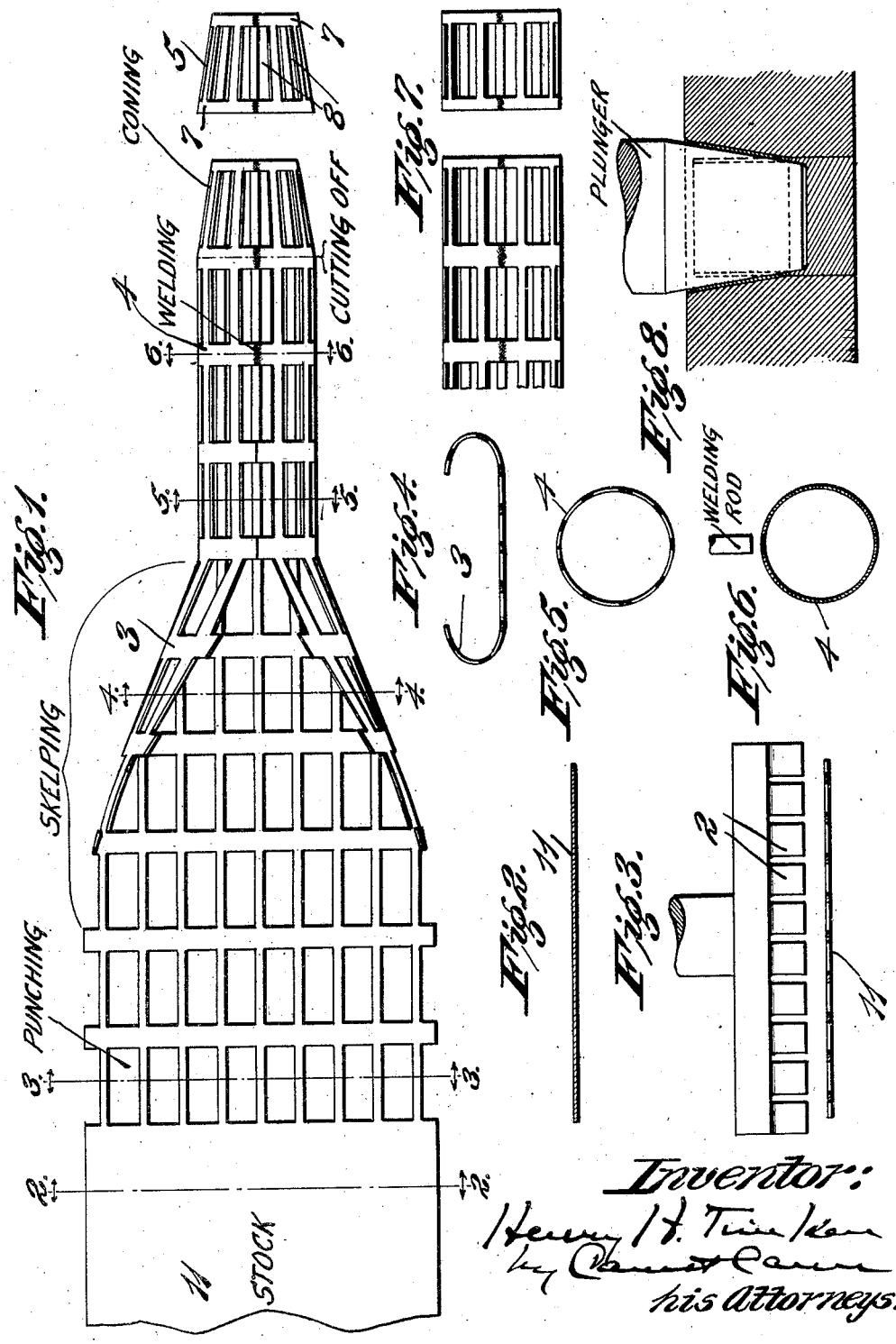

1,446,487

UNITED STATES PATENT OFFICE.

HENRY H. TIMKEN, OF CANTON, OHIO, ASSIGNOR TO THE TIMKEN ROLLER BEARING COMPANY, OF CANTON, OHIO, A CORPORATION OF OHIO.

ROLLER-BEARING CAGE AND METHOD OF MAKING SAME.

Application filed January 31, 1922. Serial No. 533,109.

*To all whom it may concern:*

Be it known that I, HENRY H. TIMKEN, a citizen of the United States, and resident of the city of Canton, county of Stark, and State of Ohio, have invented a new and useful Improvement in Roller-Bearing Cages and Methods of Making Same, of which the following is a specification.

My invention relates to the manufacture of roller bearing cages and the like. Heretofore, the manufacture of cages for roller bearings has involved a long and expensive process. The common process of making such cages has been to punch a circular disk out of a sheet of metal, draw the same into the form of a cup, punch out the central portion of the bottom thereof, punch, one at a time, longitudinally extending I-shaped slots in the side wall thereof, and spread and shape the flaps at the sides of the slots to form pockets for the rollers. These operations necessitate the repeated handling of the blank and its transfer from machine to machine. The principal object of the present invention is to devise a process of manufacturing roller bearing cages and the like in a continuous operation, that will be more expeditious and more economical of material than the old process and will effect a great saving of labor and will involve a smaller loss of product.

The invention consists principally in starting with a long band or strip of sheet metal, feeding the same forward (step by step or continuously), punching or stamping therein at each operation a complete set of openings required for the cage pockets, rolling the strip into cylindrical form and welding together the edges thereof, severing the tube thus formed between successive stampings to form cylindrical sections or cages and then, if desired, converting said cylindrical sections into conical cages. It also consists in the steps and operations hereinafter described.

In the accompanying drawing, wherein like reference characters indicate like parts wherever they occur, Fig. 1 is a diagrammatic view illustrating the process of manufacturing cages according to my invention;

Figs. 2 to 6 inclusive are, respectively, cross-sections on the correspondingly numbered lines in Fig. 1;

Fig. 7 illustrates a modification wherein the end section of the welded tube is severed while in cylindrical form, either for use in that form or into conversion into conical form; and Fig. 8 illustrates the die-shaping operation by which the cylindrical slug is converted into conical shape.

According to the present invention, I start with a long strip or band 11 of sheet steel or other suitable metal of such width that, when rolled into cylindrical form, the diameter of the cylindrical tube formed thereby will be approximately that desired for the finished article or suitable for conversion into a conical cage or other conical article of required diameter. This strip is fed forward step by step to a punch press, which is preferably provided with a gang of punches 2 arranged transversely of the strip and equal in number to the number of pockets required for the cage. The punches are, of course, so designed and arranged that, when the cage is completed, the holes formed by such punches will all be in planes that pass through the axis of the cage. By this arrangement, each operation of the press stamps all the holes required for the pockets of the cage.

The next operation after stamping the strip or band is to roll it into the form of a skelp 3 and weld the abutting (or lapping) edges so as to form a continuous tube 4. This tube is then cut off section by section, the cuts being made between successive punchings, so that each section 5 has two annular end portions 6 that are connected by longitudinally disposed bridges 7, which bridges are separated by the longitudinally extending openings or pockets 8 for the rollers. This product constitutes a cage for cylindrical rollers and is usable as such, it being considered unnecessary to describe the process of assembling the rollers in the cage.

When it is desired to adapt a cage for use with conical rollers, the cylindrical section above described is given the necessary taper by any suitable operation, as by stretching one of the annular bands at the ends thereof, or by narrowing one of said bands or by stretching one of said bands and narrowing the other. Such taper may be produced either before or after severing the cage from the end of the tube. For this purpose, the annular band at the end of the tube may be crimped throughout its periphery so as to decrease the diameter thereof before the end section is cut off. As an alternative operation, a cylindrical section is cut off from the end of the tube, set in a proper forming die and submitted to the necessary operation to contract one end thereof, or to enlarge one end thereof, according to the nature of the die, which should be designed to distribute the stretch or contraction throughout the periphery. Preferably this operation of tapering or coning is effected by a tapered punch in axial alinement with a shaping die of the size and taper required, the tubular section being placed in the die and enlarged against the conical wall thereof by the action of the punch. It is desirable to heat the tubular section before the coning operation, because the operation of welding produces therein a coarse structure resembling that of cast metal, and the die-pressing action on this hot metal has the effect of refining the structure of the weld and making it more nearly homogeneous with the main mass of metal.

Obviously either end of the cage, whether cylindrical or conical, may be flanged as desired; and the cage may be subjected to any straightening or finishing operation as well as cages made by other processes. For instance, in case the cage or welded section, after the turning of the flash therefrom, may not be of the exact size required, it may be coned to exact size; that is, it may be die-pressed with such pressure applied to the cold metal that the metal will flow plastically against the wall of the die and permanently taper the size and form thereof.

The process above described is well adapted for use with automatic machinery. Thus, the strip that is fed in flat condition to the punch press may be delivered therefrom directly to the skelping device and thence to the welding device and thence, directly or through a coning device, to the cut off device; so that, in case of a sufficiently long strip, cylindrical or conical cages or sections may be severed from one end thereof, while the other end is still flat.

While I have described the feed to and from the punch press as an intermittent or step by step feed, it is obvious that by mounting the cutters or punches on a rotatable head, a continuous feed may be used, and such continuous feed is usually preferable when the skelping and welding devices are arranged to operate on the strip while its rear portion is still passing through the punching device. In such case, the cut off devices should be mounted to move forwardly with the tube. While I have described my process as adapted for continuous operation and this continuity has the great advantage of minimizing work and makes for accuracy, it is obvious that such continuity is not essential to my invention; for a strip may be punched throughout its length before it is fed to either the welding device or the skelping device. Obviously, when it is desired that the margins of the bridge pieces shall have wings or flaps for cooperating in forming pockets for the rollers, the holes should be I-shaped; and, likewise the shape of the holes in the flat strip should be designed with reference to the subsequent operations and the final form required in the finished article.

Likewise, while the foregoing description contemplates that the line of weld shall run longitudinally of the strip of sheet metal, and that the weld shall be made prior to the severance of the section from the strip, I also contemplate the opposite conditions. For instance, instead of the gang of punches being disposed in a straight line transversely of the sheet, they may be arranged in an arcuate form disposed either crosswise or endwise of the sheet. In the latter case, a blanking punch is associated with said punches which blanking punch will punch out an arcuate blank having therein the punched holes made by said gang of punches and the punched blank is rolled into conical form and welded along its meeting ends.

Obviously the invention admits of various changes and I do not wish to limit myself to the operations heretofore described. Likewise, it is adapted for manufacturing other articles besides roller bearing cages.

What I claim is:

1. The process of manufacturing cages for roller bearings and the like which consists in operating on a long strip or band of metal to form therein series of openings, converting said strip into a welded tube, and severing the same into sections between adjacent series of openings.

2. The process of manufacturing cages for roller bearings and the like which consists in punching transverse series of I-shaped holes in a strip or band of metal, converting said punched strip into a closed tube, and severing the same into sections between adjacent series of holes.

3. The process of manufacturing cages for roller bearings and the like which consists in punching transverse series of openings in a strip or band of metal, converting said strip into a welded tube, coning the end portion of said tube and severing said coned portion between adjacent series of openings.

4. The process of manufacturing cages for roller bearings and the like which consists in operating on an elongated strip or band of metal to form therein series of openings, rolling said punched strip and welding the longitudinal edges thereof, severing off a section between adjacent series of openings, and die shaping said section under pressure sufficient to plastically flow the metal thereof to the form of the die.

5. The process of manufacturing cages for roller bearings and the like which consists in operating on an elongated strip or band of metal to form therein series of openings, rolling said punched strip and welding the longitudinal edges thereof, severing off a section between adjacent series of openings, and heating said section and die shaping the same while hot to improve the weld.

6. The process of manufacturing cages for roller bearings and the like which consists in operating on an elongated strip or band of metal to form therein series of openings, rolling said punched strip and welding the longitudinal edges thereof, severing off a section between adjacent series of openings, and heating said section and die shaping the same while hot into conical form.

7. The process of manufacturing cages for roller bearings and the like which comprises the punching of transverse series of shaped holes in a strip or band of metal, converting said strip into a closed tube, changing the diameter of the end portion of said tube to convert it into conical form, and severing said end portion between adjacent series of holes, the operations of severing and coning being performed in whatever sequence is desired.

8. The process of manufacturing cages for roller bearings and the like which comprises the punching of transverse series of I-shaped holes in a strip or band of metal, converting said strip into a closed tube, changing the diameter of the end portion of said tube to convert it into conical form, and severing said end portion between adjacent series of holes, the operations of severing and coning being performed in whatever sequence is desired.

9. The process of making cages for roller bearings and the like which comprises the curving of a suitably punched blank into a hollow cage of circular section, welding the adjacent ends together, heating the same, and die-shaping the cage while hot, whereby the structure of the weld is refined.

10. A cage for roller bearings or the like, comprising a punched blank curved into a form of circular section with its ends welded together and hot-struck to shape the same and improve the structure of the weld.

11. A conical cage for roller bearings or the like, comprising a punched blank curved into a form of circular section with its ends welded together and hot-struck to shape the same and improve the structure of the weld.

12. A cage for roller bearings or the like, comprising an arcuate blank having an arcuate series of holes therein curved into conical shape and with its ends welded together.

13. A cage for roller bearings or the like, comprising an arcuate blank having an arcuate series of holes therein curved into conical shape and with its ends welded together and hot struck to shape the same and improve the structure of the weld.

Signed this 28th day of January, 1922, at Canton, Ohio

H. H. TIMKEN.